(12) United States Patent
Wallace et al.

(10) Patent No.: US 6,405,475 B1
(45) Date of Patent: *Jun. 18, 2002

(54) LIGHTED FISHING ROD

(76) Inventors: William R. Wallace, #16 Stacy La., Washington, MO (US) 63090; Thomas A. Wallace, 20 Sena Fawn, Cape Girardeau, MO (US) 63701

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,060

(22) Filed: Apr. 16, 1997

(51) Int. Cl.[7] ........................ A01K 75/02; A01K 87/00
(52) U.S. Cl. ...................................................... 43/17.5
(58) Field of Search ............................ 43/17.5; 362/109

(56) References Cited

U.S. PATENT DOCUMENTS

| | | | | | |
|---|---|---|---|---|---|
| 1,190,872 A | * | 7/1916 | Dildine | ........................ | 43/17.5 |
| 1,448,120 A | * | 3/1923 | Johnson | ........................ | 43/17.5 |
| 2,565,633 A | * | 8/1951 | Scott | ........................ | 43/17.5 |
| 2,579,087 A | * | 12/1951 | Organ | ........................ | 43/17.5 |
| 2,646,640 A | * | 7/1953 | George | ........................ | 43/17.5 |
| 2,791,676 A | * | 5/1957 | Cote | ........................ | 43/17.5 |
| 2,805,508 A | * | 9/1957 | Oldfield | ........................ | 43/17.5 |
| 3,017,499 A | * | 1/1962 | Fore | ........................ | 43/17.5 |
| 4,085,437 A | * | 4/1978 | Hrdlicka | ........................ | 43/17.5 |
| 4,621,447 A | * | 11/1986 | Rhodes | ........................ | 43/17.5 |
| 4,750,287 A | * | 6/1988 | Myers | ........................ | 43/17.5 |
| 4,780,980 A | * | 11/1988 | McCullough | ........................ | 43/17.5 |
| 5,644,864 A | * | 7/1997 | Kelly | ........................ | 43/17.5 |

* cited by examiner

Primary Examiner—Kurt Rowan
(74) Attorney, Agent, or Firm—Greensfelder, Hemker & Gale, P.C.

(57) ABSTRACT

A lighted fishing rod is provided. A light source is disposed in near proximity to the rod tip for illuminating the rod tip and line, while having sufficient luminosity to effectively light a surrounding area to enable one to see one's way in the dark. The power source for the light is located in the handle of the rod, with electrical connections passing within the hollow rod leading from the power source to the light source. Switch means are located on the exterior of the handle for turning on and off the light.

5 Claims, 5 Drawing Sheets

LIGHTED FISHING ROD

BACKGROUND OF THE INVENTION

Fishing is an activity that draws avid enthusiasts, many of whom can not seem to be satisfied in limiting their enjoyment to daylight hours. Oftentimes, their expeditions will take them well past sunset, to the point of complete darkness. Unless the fisherman has a light source, such as a lantern or flashlight, further fishing would be almost futile. Besides not being able to string a line or bait a hook, one could not detect the subtle movement of the line or rod tip which provides important visual cues to the fisherman to be able to catch fish. Also, without a flashlight, a fisherman who stays past dusk may have trouble negotiating his return from the water in darkness.

While the prior art shows many types of illuminated fishing rods, most are directed towards providing a luminous rod shaft or a light at the tip of the rod. The luminous rods cast diffuse light along the entire rod length which can attract insects to the proximity of the fisherman. The lights at the rod tip are often subdued in strength and merely provide a scant illumination. They tend to be ineffective for casting the type of light needed for finding one's way along in the dark. Further, many of these types of rods have the illumination and/or power source in cumbersome locations on the rod which can cause the reel line to become entangled.

It would be desirable to provide a lighted fishing rod which could effectively address all situations arising from night fishing, including illuminating the area around the end of the rod so that both the fishing line and rod tip can be observed, maintaining the light at a spaced distance from the user to minimize insect annoyance, and providing a light source of sufficient luminosity so that the rod can serve as a flashlight.

SUMMARY OF THE INVENTION

By means of the instant invention there is provided a lighted fishing rod which provides a mounted light source in proximity to the rod tip for illuminating the rod tip and line, while having sufficient luminosity to effectively light a surrounding area to enable one to see one's way in the dark. The power source for the light is located in the handle of the rod, with electrical connections passing within the hollow rod leading from the power source to the light source toward the end of the rod. Switch means are located on the exterior of the handle for turning on and off the light.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
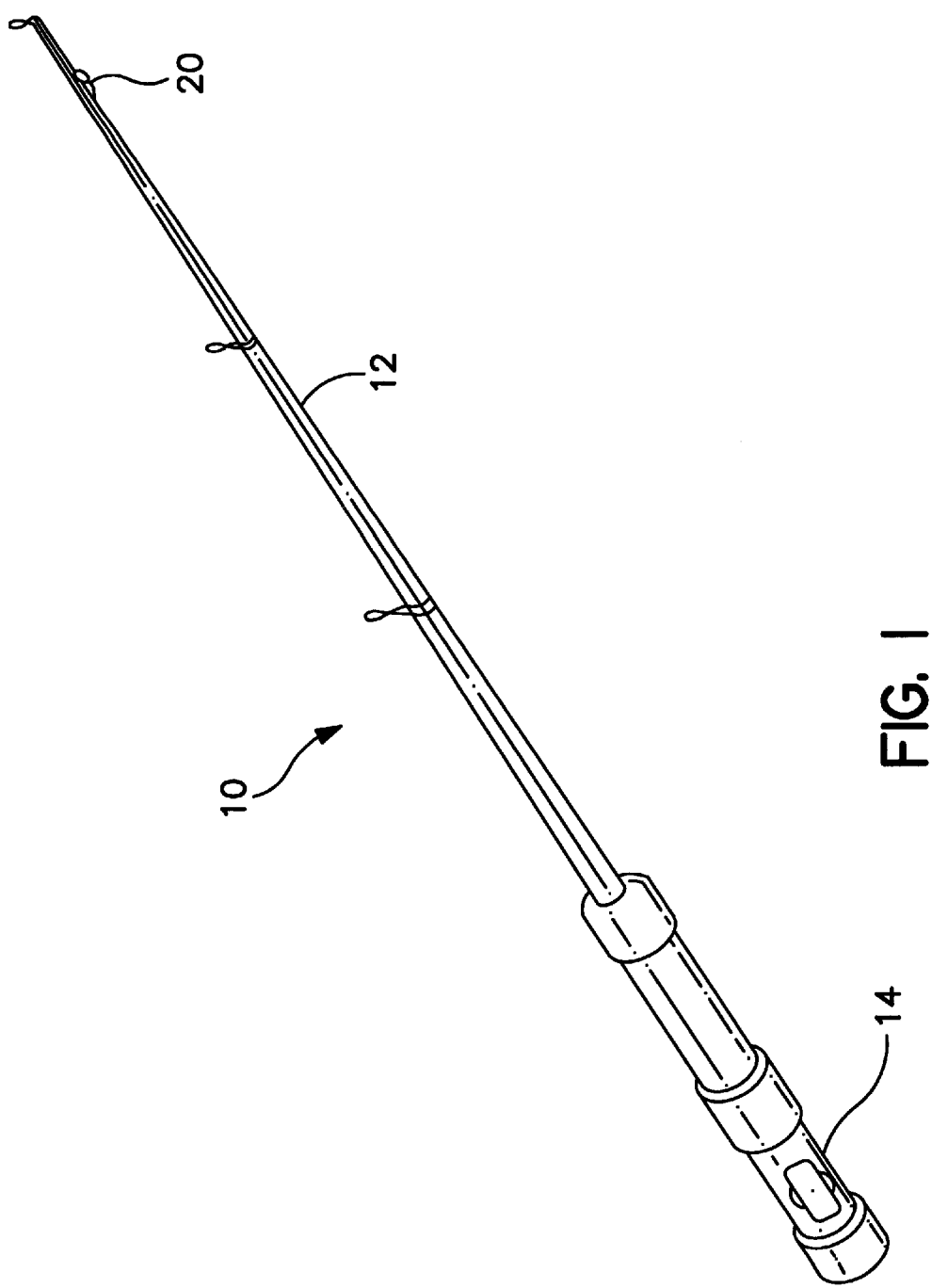
FIG. 1 is a perspective view of the lighted fishing rod of the invention.
Figure 2:
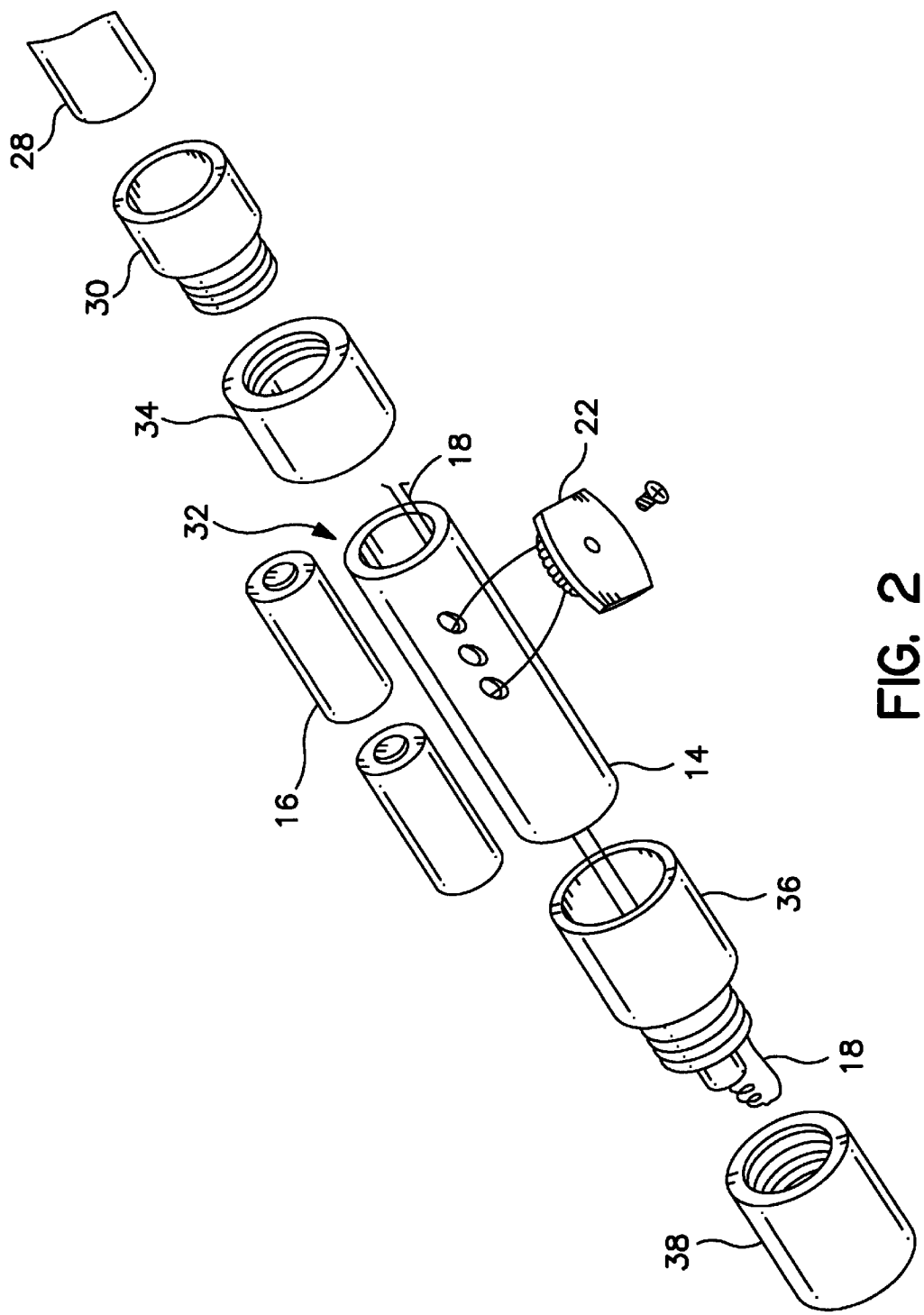
FIG. 2 is an exploded view of the rod handle, which houses the power source.
Figure 3:
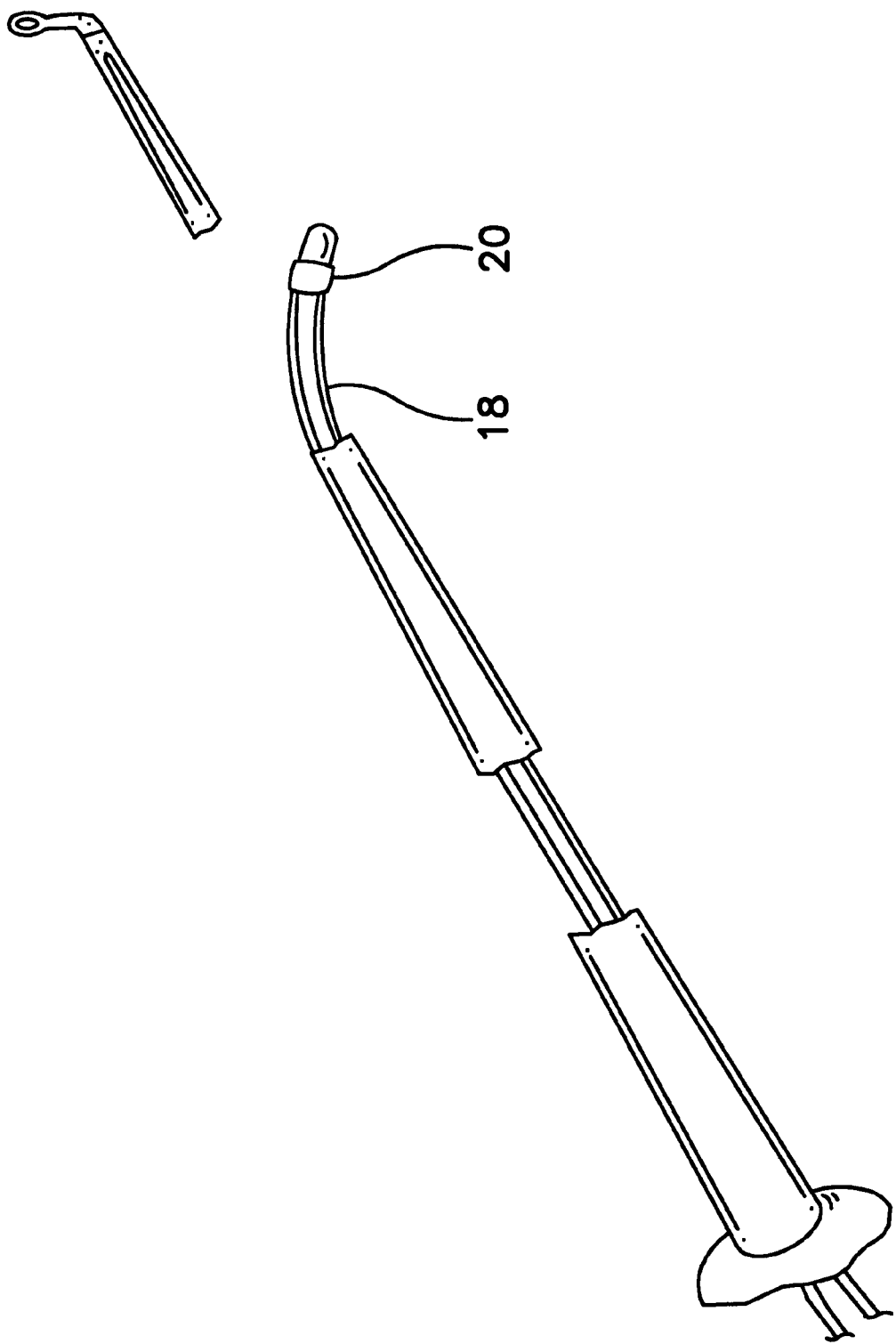
FIG. 3 is a view, partially broken away, showing the internal wiring in the rod.
Figure 4:
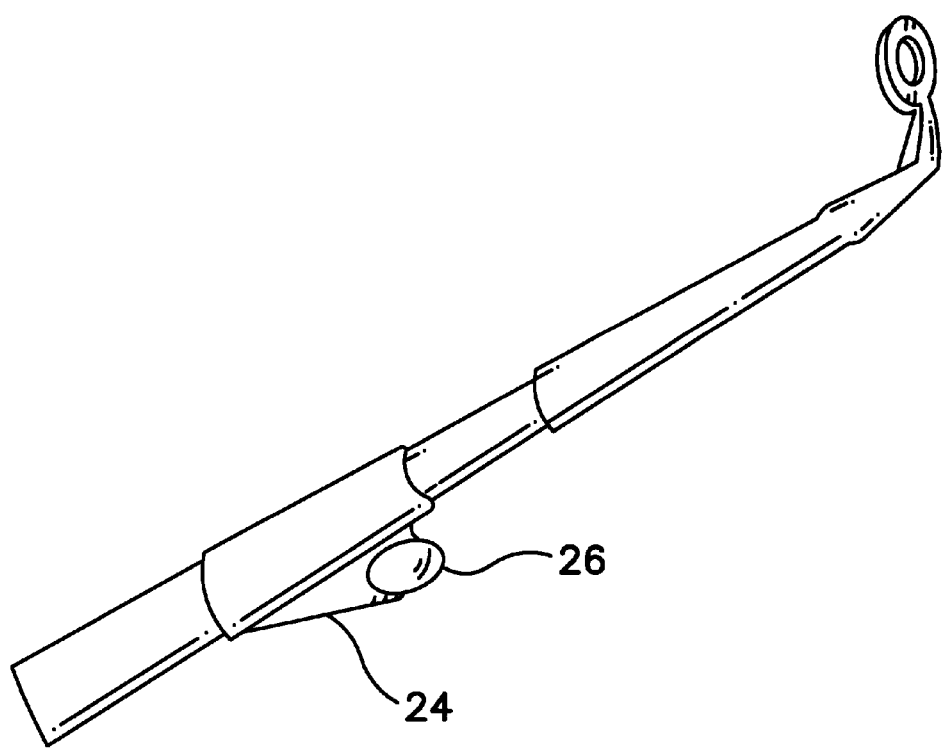
FIG. 4 is a view showing the tip end of the rod.
Figure 5:
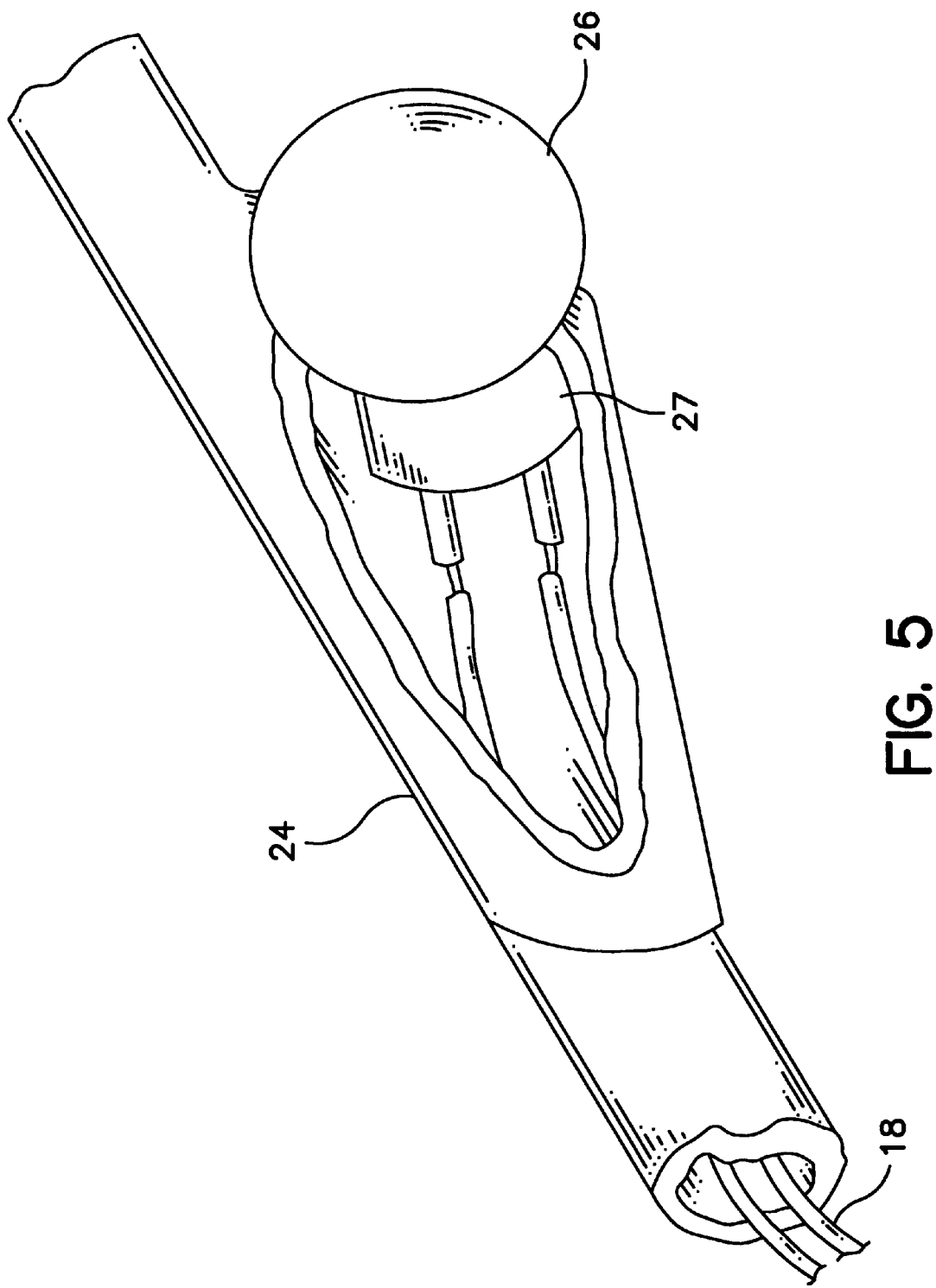
FIG. 5 is a focused view, partially broken away, showing the light source housing.

The fishing rod of the invention is generally indicated by the reference numeral 10 as best shown in FIG. 1. It is comprised of a rod portion 12 and a handle portion 14. Both rod and handle portions are hollow. Handle 14 serves as the housing for the power source of the light and is shown in more detail in FIG. 2. Batteries 16 are received within handle 14. Electric wire 18 is connected to the batteries and is strung along the inside of rod 12 to transmit current to light source 20 as shown in FIG. 3. Electric wire 18 passes through switch 22, which can be manipulated to open and close the electrical circuit for turning the light on and off. Switch 22 is located on the outside of handle 14. Light source 20 comprises a housing 24 and light bulb 26, which are placed a short distance away from the tip end to avoid fishing line entanglement. Electrical wire 18 connects to light bulb socket 27 as seen in FIG. 5. Light bulb 26 should be of a type, i.e., a 2.5 volt, 3.5 milliamp filament bulb, having sufficient luminosity power to provide surrounding light and directional light. The bulb is removable from the housing and can be replaced for repair as necessary.

A standard fishing rod may be adapted to create the lighted fishing rod of the instant invention. The best rod to modify is the type for receiving a spin-cast type reel because it has a simple, tubular handle. A power source housing adaptor 30, as shown in FIG. 2, is placed over the end of the rod handle 28. It may be desirable to cut off a portion of the rod handle beforehand so that the resultant modified handle is not too long. Adaptor 30 may press-fitted over the rod handle end, or screwed onto the threads normally provided on the rod for adjusting the reel. Power source housing 32 receives batteries 16, which can be AAA size. Housing 32 has threaded connector caps 34 and 36, all of which are optimally constructed of PVC material. Switch housing 22 receives wires 18 leading from the batteries through or along housing 32. End cap 38 is provided to hold the batteries within the housing and to allow access for battery replacement. Electrical wire 18 is passed along the interior of the rod towards the tip end. A portion of the far end of the rod, between the tip and main part of the rod may be removed so that there is sufficient interior space within the rod to accommodate internally therein wire 18 to near proximity to the tip of the rod and so that there is sufficient structural strength to support the light housing 24. An anterior section of the rod is thus removed, and the tip is then reattached after wires 18 are strung through the rod end. Thus, the light is spaced apart from the tip end of the finished rod. Wires 18 emerge from the rod at the removal point and are connected to socket 27, which is placed externally of the rod where the wires emerge. The socket is secured to the rod by appropriate means, such as by tying. The modified rod may be made waterproof by sealing all connecting points and openings with glues or sealants, such as minimal expanding liquid foam sealant.

By providing the power source and electrical line within the rod, fishing line entanglement is avoided. The placement of the light spaced slightly apart from the tip of the rod provides sufficient surrounding light for observing subtle rod and line activity, yet remains sufficiently remote from the user to minimize contact with insects attracted by the light. The intensity of the bulb provides good directional light, allowing the rod to be pointed and used like a flashlight.

Various changes and modifications may be made within this invention as will be apparent to those skilled in the art. Such changes and modifications are within the scope and teaching of this invention as defined in the claims appended hereto.

What is claimed is:

1. A lighted fishing rod assembly, said fishing rod assembly comprising an elongated rod member, a handle and a light source, said handle being connected to said rod member, said light source being disposed on said rod member towards a free end thereof, and spaced a slight distance apart from a tip of said free end, said light source being provided within a housing, said housing being disposed within said rod member at said slight distance apart from said tip of said free end, a power source for said light source being disposed within said handle, said rod member being hollow, electrical wires connecting said power source to said light source being disposed within said rod member, a switch for controlling power to said light source being disposed on an exterior surface of said handle, said light source having a luminosity sufficient to illuminate an area substantially beyond said free end of said rod member, whereby said rod assembly can be used as a flashlight.

2. The lighted fishing rod assembly of claim 1 in which said light source comprises a light bulb, said bulb being disposed externally of said rod member, said light bulb being removable and replaceable.

3. The lighted fishing rod assembly of claim 1 in which said power source is removably received within said handle.

4. The lighted fishing rod assembly of claim 1 in which said rod member and said handle are waterproof to prevent leakage therein of water.

5. The lighted fishing rod assembly of claim 1 in which said light source comprises a light bulb, said bulb being disposed externally of said rod member, said light bulb being removable and replaceable, said power source being removably received within said handle, and said rod member and said handle being waterproof to prevent leakage therein of water.

* * * * *

UNITED STATES PATENT AND TRADEMARK OFFICE
CERTIFICATE OF CORRECTION

PATENT NO. : 6,405,475 B1  
APPLICATION NO. : 08/843060  
DATED : June 18, 2002  
INVENTOR(S) : Wallace et al.

Page 1 of 1

It is certified that error appears in the above-identified patent and that said Letters Patent is hereby corrected as shown below:

On the title page,
Item (*) delete "0" and insert --550--.

Signed and Sealed this

Fifth Day of December, 2006

JON W. DUDAS
*Director of the United States Patent and Trademark Office*